US008033572B2

(12) United States Patent
Arzberger et al.

(10) Patent No.: US 8,033,572 B2

(45) Date of Patent: Oct. 11, 2011

(54) VEHICLE, IN PARTICULAR CONSTRUCTION VEHICLE

(75) Inventors: Maximilian Arzberger, Igenhausen (DE); Ludwig Andreas Huber, Thalhausen (DE)

(73) Assignee: Bauer Maschinen GmbH (DE)

( * ) Notice: Subject to any disclaimer, the term of this patent is extended or adjusted under 35 U.S.C. 154(b) by 0 days.

(21) Appl. No.: 12/699,619

(22) Filed: Feb. 3, 2010

(65) Prior Publication Data

US 2011/0031728 A1 Feb. 10, 2011

(30) Foreign Application Priority Data

Feb. 16, 2009 (EP) .................................... 09002135

(51) Int. Cl.
*B60R 21/00* (2006.01)

(52) U.S. Cl. ....................................................... 280/755

(58) Field of Classification Search .................. 280/755, 280/757, 759, 760

See application file for complete search history.

(56) References Cited

U.S. PATENT DOCUMENTS 5,598,935 A 2/1997 Harrison et al.

FOREIGN PATENT DOCUMENTS

| | | | |
|---|---|---|---|
| DE | 297 04 212 | U1 | 5/1997 |
| DE | 198 01 837 | A1 | 7/1999 |
| DE | 198 03 780 | A1 | 7/1999 |
| DE | 20 2006 019421 | U1 | 4/2008 |
| SU | 1158485 | A1 | 5/1985 |
| SU | 1640314 | A1 | 4/1991 |

OTHER PUBLICATIONS

European Search Report dated Apr. 20, 2009 for EP 09 00 2135.

*Primary Examiner* — Faye M. Fleming

(74) *Attorney, Agent, or Firm* — Studebaker & Brackett PC; Donald R. Studebaker

(57) ABSTRACT

The invention relates to a vehicle, in particular a construction vehicle, comprising a detachable ballast weight, a lifting means for lifting the ballast weight from a set-down position into a mounting position on the vehicle and a support means having at least one extendable support foot. An especially compact construction is achieved in that for extension of the at least one support foot the support means has at least one positioning cylinder and that the at least one positioning cylinder is designed at the same time for lifting and lowering the ballast weight.

12 Claims, 7 Drawing Sheets

VEHICLE, IN PARTICULAR CONSTRUCTION VEHICLE

The invention relates to a vehicle, in particular a construction vehicle, comprising a detachable ballast weight, a lifting means for lifting the ballast weight from a set-down position into a mounting position on the vehicle and a support means having at least one extendable support foot, in accordance with the preamble of claim 1.

Construction vehicles, as for example crane trucks, mobile drilling rigs and vibrators, are often provided with ballast weights. The ballast weights serve to reduce the risk of tilting of the vehicle and are usually arranged opposite a mast or a working device on the construction vehicle.

In order to reduce the total weight of the vehicle during transport from and to the construction site and thereby stay under the specified limit values it is common practice to detach the ballast weight from the vehicle and transport it separately to the site of operation. On the construction site the ballast weight is then mounted on the vehicle again.

To enhance the tilting stability it is furthermore known to make use of an additional support means on the vehicle. As a rule, this support means consists of several support feet which can be extended and increase the contact surface of the vehicle on the ground.

A generic vehicle can be taken for example from U.S. Pat. No. 3,278,045. For lifting and mounting the ballast weight on the vehicle use is made of the cable winch means of a crane. During the lifting of the ballast weight the vehicle is additionally supported by extended support feet.

Furthermore, from EP 1 780 167 A2 a mobile crane is known, in which a separate cable winch means is provided for lifting the ballast weight.

In addition, from U.S. Pat. No. 3,902,735 an excavator with a lifting means for a ballast weight can be taken. The lifting means comprises a pivot arm, which is attached to the underside of an upper carriage and is pivoted by means of a pair of positioning cylinders for lifting and lowering the ballast weight.

The invention is based on the object to provide a vehicle, in particular a construction vehicle, which, whilst having a simple construction, permits good handling of the ballast weight.

In accordance with the invention the object is solved by a vehicle having the features of patent claim 1. Preferred embodiments are stated in the dependent claims.

The vehicle according to the invention is characterized in that for extension of the at least one support foot the support means has at least one positioning cylinder and that the at least one positioning cylinder is designed at the same time for lifting and lowering the ballast weight.

A fundamental idea of the invention resides in the fact that no additional lifting means is provided for lifting the ballast weight. Instead, for this purpose use is made of the positioning cylinder which is normally of the hydraulic type and is arranged for extending a support foot. As a result, the constructional effort of the entire device is simplified since the lifting and lowering of the ballast weight and the extension of the support feet does not have to take place simultaneously.

In accordance with the invention it is preferred that the at least one positioning cylinder has a piston rod, which can be connected both to a support disk and to the ballast weight. Thus, if required the support disk that forms a contact of the support foot on the ground can be removed from the piston rod by a detachable connection means. In this way the support disk can be designed with a large diameter and removed easily when the positioning cylinder is detachably connected to the ballast weight. The connection means for the support disk can be designed separately from a connection means for the ballast weight. In particular, for the fastening of the support disk a simple thread connection or a simple bolting is sufficient.

Basically, the positioning cylinders can be arranged laterally next to the ballast weight. In order to actuate the ballast weight as free of a bending moment as possible it is of advantage in accordance with the invention that for each positioning cylinder the ballast weight has a passage, through which the respective positioning cylinder reaches. The passages can be arranged at the centre of the ballast weight in particular so that practically no bending moment is applied to the positioning cylinder or cylinders. This permits a further simplification of the construction as well as a direct connection without lever mechanism.

In addition, it is in accordance with the invention that for detachably connecting the ballast weight to the piston rod of the at least one positioning cylinder a locking means is provided. The locking means can be operated automatically, for instance by means of a proper locking cylinder, or manually.

In this connection it is especially preferred according to the invention that the locking means comprises at least one latch bolt for establishing a form-fitting connection. The latch bolt can be actuated transversely to the movement direction of the piston rod, i.e. in an approximately horizontal manner. To this end horizontal passages can be formed on the ballast weight for the latch. Through a latch bolt at least a form-fitting fastening of the ballast weight on the positioning cylinder is achieved. By way of appropriate conical surfaces on the latch bolt or on the related counter-surfaces of both the piston rod and the ballast weight an additional clamping effect and therefore a further force-fitting component can be achieved during the lifting of the ballast weight.

An increase in the variability of the vehicle according to the invention is achieved in that the ballast weight has a base plate, on which further ballast plates can be fixed and that the locking means is designed in the portion of the base plate. The ballast weight is composed of plates or segments with the lowermost bearing plate being the base plate. Depending on the total weight required for ballasting one or several further ballast plates can be placed on the base plate and connected thereto. The ballast plates can be designed as simple metal or concrete plates since the base plate alone comprises the locking means with the latch and possible latch passages.

Furthermore, it is in accordance with the invention that a fastening means is provided on the vehicle, with which the ballast weight can be detachably fastened on the vehicle in the mounting position. Once the ballast weight has been lifted by the lifting means into the mounting position the ballast weight is connected in a fixed manner through the fastening means to the frame of the vehicle. Afterwards, the locking means between the ballast weight and the positioning cylinder can be detached so that the positioning cylinders are then available again for use as a support means. To dismount the ballast weight the procedure is followed vice versa.

Basically, the support and lifting means according to the invention can be employed on both wheeled and track-laying vehicles. The chassis can be rigidly connected to the superstructure. According to the invention it is especially preferred that the vehicle has an undercarriage and an upper carriage rotatably supported thereon, whereby in the mounting position the positioning cylinder and the ballast weight are arranged on a rear portion of the upper carriage. Here, in a front portion lying opposite the rear portion the heavy working implement, such as a mast with a drilling drive, is normally arranged. To prevent tilting in the direction of the front portion the ballasting is provided on the rear portion. Hence, the arrangement according to the invention on the rotatable upper carriage ensures tilting stability even if the longitudinal direction of the upper carriage is turned with respect to the longitudinal direction of the undercarriage.

In this connection it is preferred that the ballast weight on the upper carriage reaches in at least one position beyond the undercarriage and can be placed vertically into the set-down position on the ground by means of the at least one positioning cylinder. The position is preferably that of the upper carriage, in which it is aligned with its longitudinal direction to the longitudinal direction of the undercarriage. However, it is also possible to mount or dismount the ballast weight when the upper carriage is turned through 90° since the length of the upper carriage normally exceeds the width of the undercarriage.

It is in accordance with the invention that during operation the support disk is arranged on the piston rod below the ballast weight in the mounting position. In this, the support cylinder is connected in a fixed manner with its cylinder housing on the superstructure of the vehicle, more particularly on the upper carriage, and the piston rod reaches from above through the entire ballast weight and protrudes from the underside of the ballast weight. In this position the support disk, which can have a larger diameter than the passage through the ballast weight in particular, can be connected to the piston rod. By doing so it is then possible to move the support disk downwards in order to additionally support the vehicle with respect to the ground.

An especially stable lifting means is achieved in accordance with the invention in that two positioning cylinders are provided which can be actuated simultaneously for lifting and lowering the ballast weight. Here, the two positioning cylinders are arranged symmetrically to the longitudinal axis of the vehicle as well as in the center area of the ballast weight. By making use of two positioning cylinders the lifting of large weights for ballasting together with a continued compact construction is also accomplished.

In the following the invention will be described further by way of preferred examples of embodiments illustrated schematically in the accompanying drawings, wherein.

Figure 1:
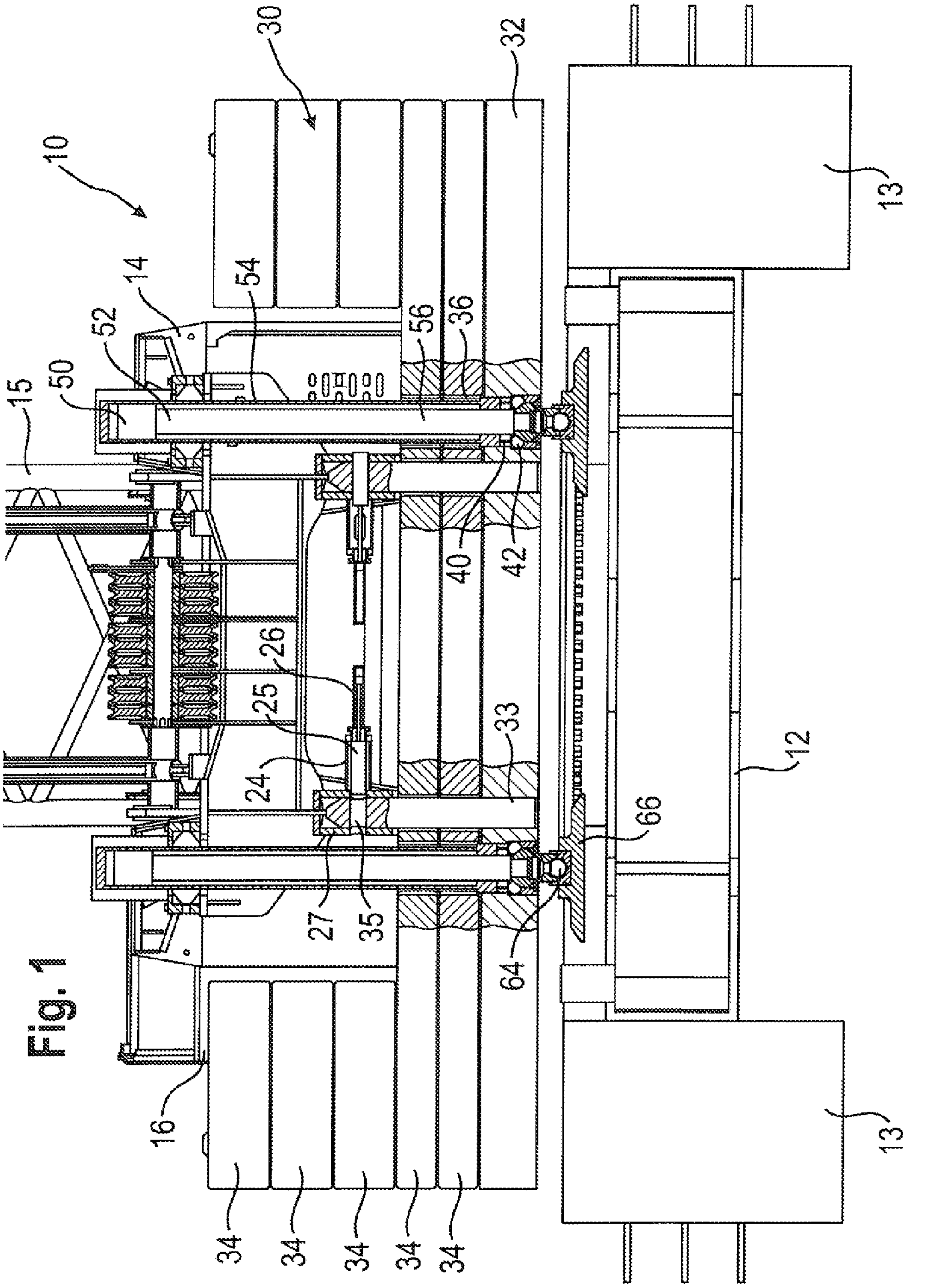
FIG. 1 shows a schematic partially cross-sectional view of a vehicle according to the invention.

In the first embodiment according to FIG. 1 of a vehicle 10 in accordance with the invention the latter comprises an undercarriage 12 with lateral crawler tracks 13. An upper carriage 14 is rotatably supported on the chassis of the undercarriage 12. On the illustrated rear portion 16 of the upper carriage 14 a ballast weight 30 according to the invention is arranged. Opposite the rear portion 16 a mast superstructure 15, depicted only in part, is arranged on the upper carriage 14.

In order to avoid the risk of tilting towards the mast superstructure 15 during operation of the vehicle 10, the ballast weight 30 according to the invention is positioned on the rear portion 16 of the upper carriage 14. The ballast weight 30 comprises a lowermost base plate 32, onto which several ballast plates 34 are stacked according to the ballasting required.

In a center portion of the base plate 32 two cylindrical retaining shafts 33 are fixed that protrude through passages in the two lower retaining plates 34 in the upward direction into a recess disposed on the ballast weight 30. To fasten the ballast weight 30 on the rear portion 16 two fastening means 24 are arranged on the upper carriage 14, which each have a horizontally directed actuating cylinder 26 with a locking bolt 25. The actuating cylinders 26 are each fixed on accommodating sleeves 27 that are connected in a fixed manner to the upper carriage 14.

In the illustrated mounting position of the ballast weight 30 on the upper carriage 14 the retaining shafts 33 protrude into the two accommodating sleeves 27. By moving the locking bolts 25 through a corresponding bolt passage 35 located in the retaining shafts 33 and the accommodating sleeves 27 a form-fitting locking of the ballast weight 30 on the upper carriage 14 is brought about. The locked position can be seen in FIG. 1 on the right fastening means 24, whereas the left fastening means 24 shows the locking bolt 25 in the retracted position for dismounting the ballast weight 30.

Figure 2:
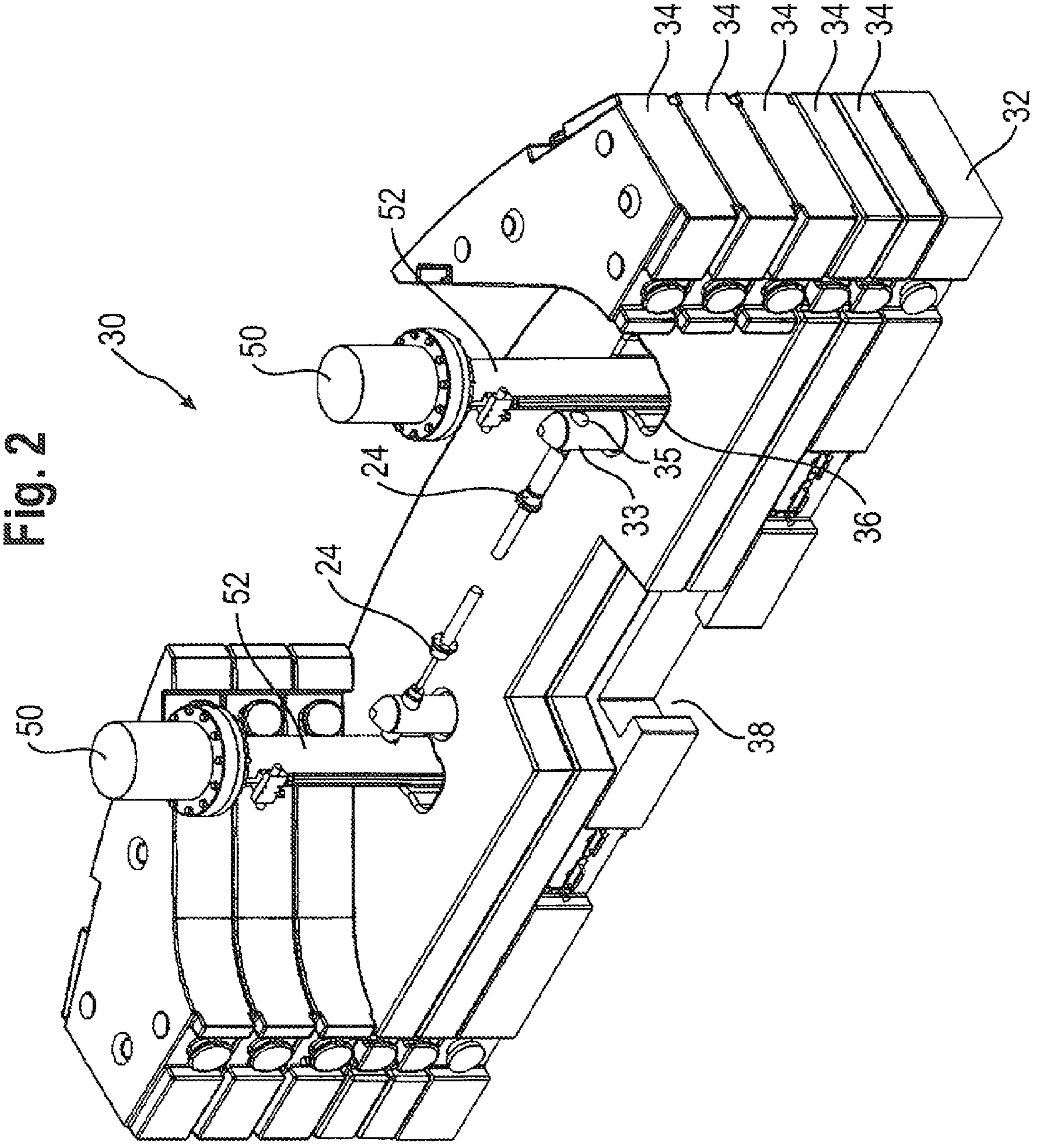
FIG. 2 shows a perspective view of the ballast weight of FIG. 1.
Figure 3:
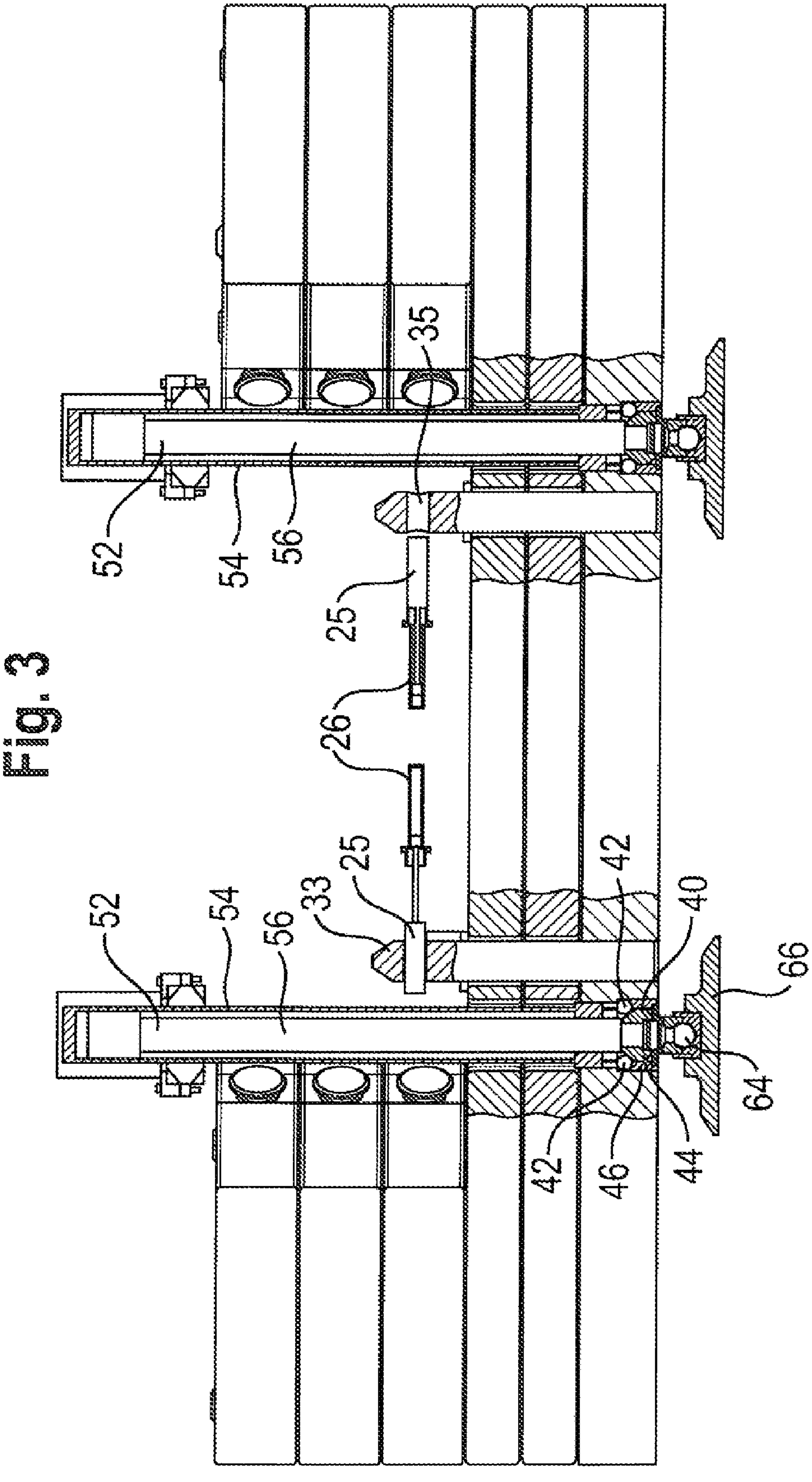
FIG. 3 shows a partially cross-sectional view of the ballast weight of FIG. 2.

As can also be seen in greater detail in conjunction with FIGS. 2 and 3, the vehicle 10 according to the invention has a lifting means 50 with two positioning cylinders 52, which extend in a center portion of the ballast weight 30 through the base plate 32 and the two lower ballast plates 34 through corresponding passages 36 from top to bottom. The two positioning cylinders 52 are fastened on the rear portion 16 of the upper carriage 14. The said cylinders each comprise a cylinder casing 54 in which a piston rod 56 can be moved through an appropriate supply and discharge of a hydraulic fluid. The lower end of the piston rod 56 serves as a support foot 64, for which purpose it is provided with a cylindrical support disk 66. The support disk 66 is connected via a detachable connection means to the piston rod 56.

Slightly above the support disk 66 a locking means 40 is provided in the portion of the base plate 32, with which the piston rod 56 can be connected to the base plate 32 of the ballast weight 30. To this end each piston rod 56 has a ring-shaped conical element 44 with inclined external surfaces. On the related passage 36 of the base plate 32 suitable fixation sleeves 46 are arranged such that through horizontal insertion of two latch bolts 42 a form-fitting connection is established between the piston rod 56 and the base plate 32. With this locking the ballast weight 30 can be moved vertically by the lifting means 50 with the two positioning cylinders 52 between the illustrated mounting position on the upper carriage 14 and a set-down position on the ground. An additional centering on the upper carriage 14 is effected by way of an adjusting groove 38 arranged on the side of the ballast weight 30 facing towards the upper carriage 14.

Figure 4:
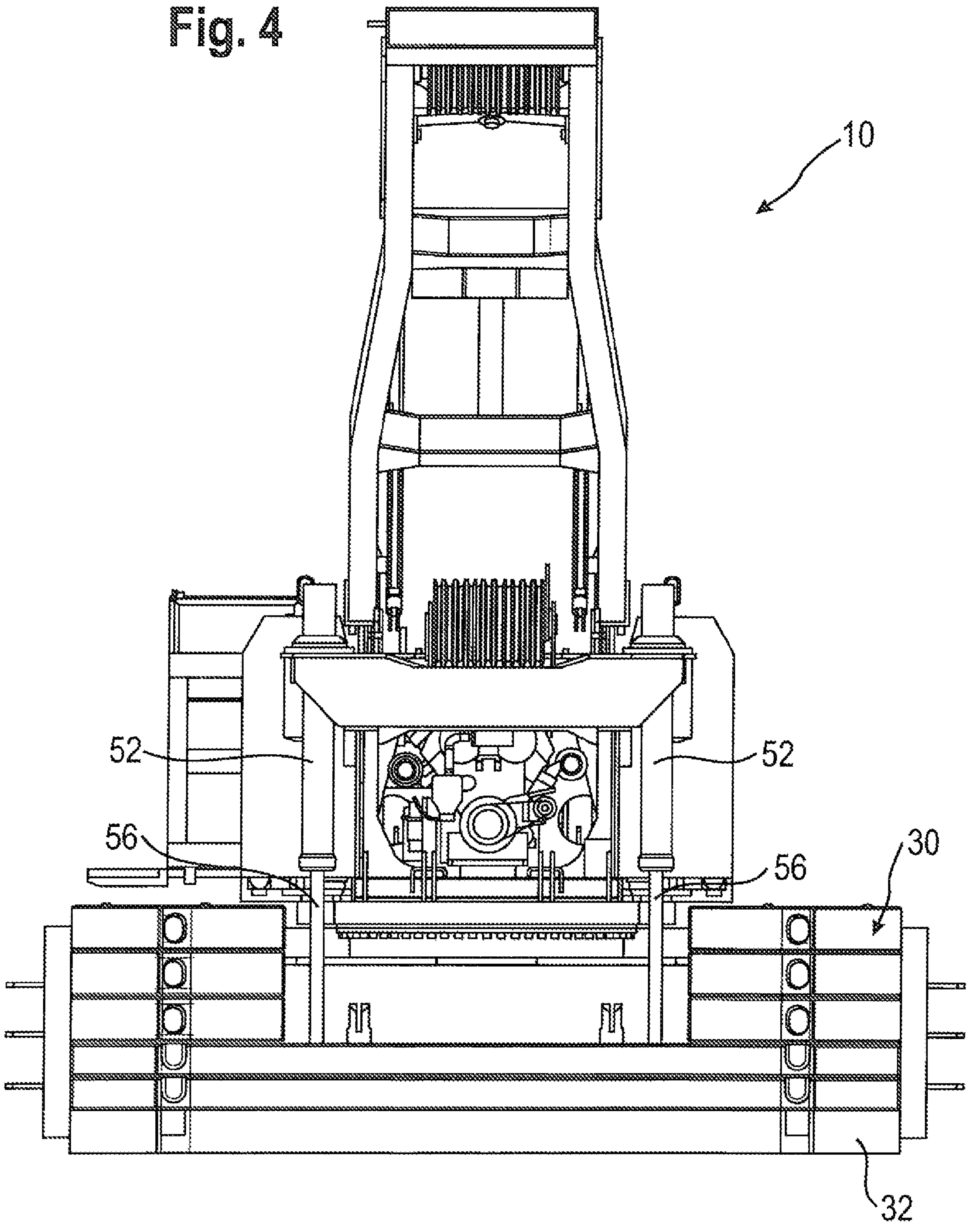
FIG. 4 shows a lateral view of a further vehicle according to the invention with the ballast weight located in the set-down position.
Figure 5:
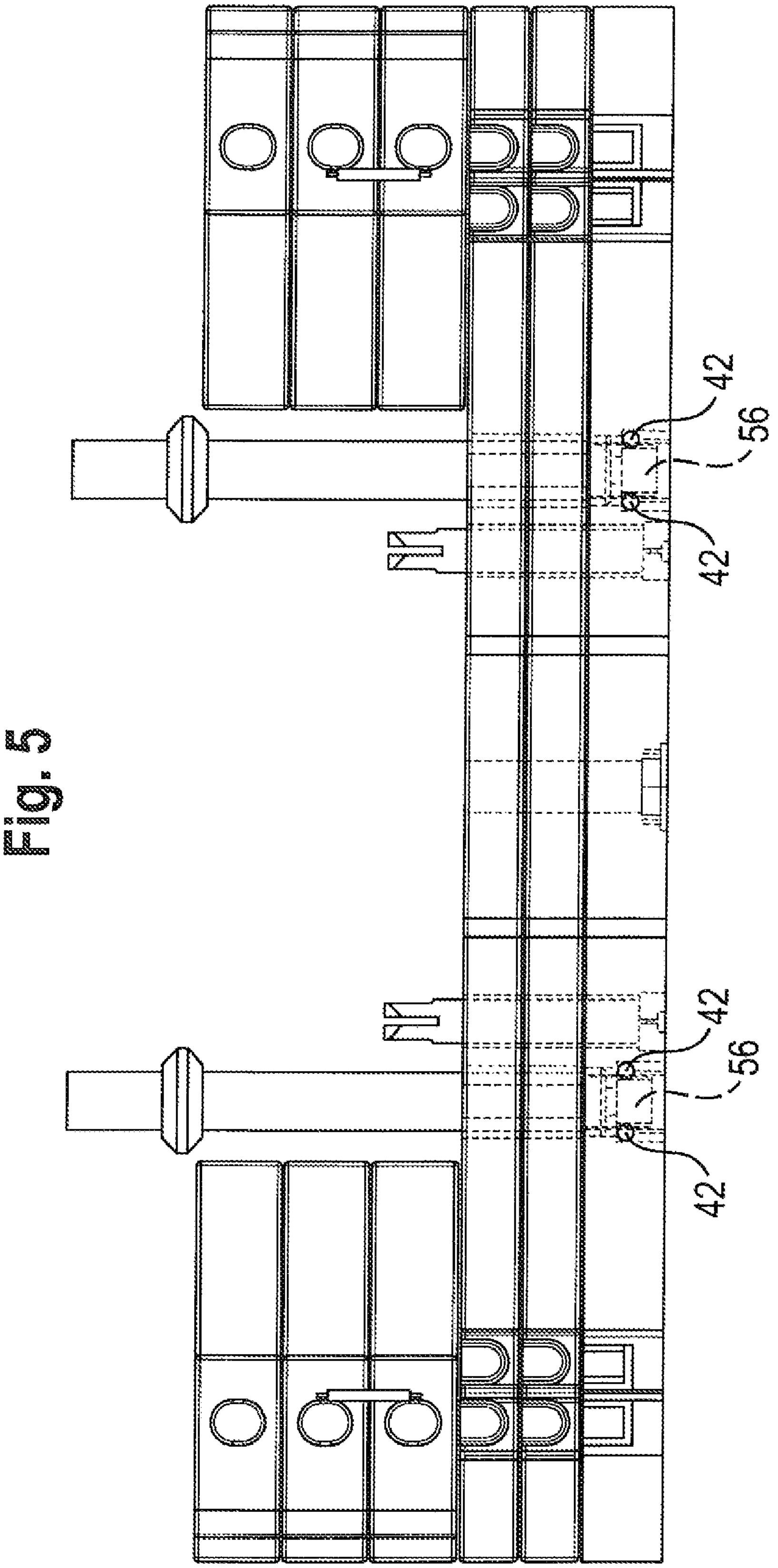
FIG. 5 shows an enlarged partial view of the ballast weight in the set-down position.

FIG. 4 shows by way of a further embodiment the set-down position in which the ballast weight 30 rests with the base plate 32 on the ground. In this position the ballast weight 30 can be picked up by the vehicle 10 by which the latter moves towards the ballast weight 30 and is adjusted for further installation. Following the adjustment, the piston rods 56 of the positioning cylinders 52 can be extended vertically downwards up to the position according to FIG. 5.

Figure 6:
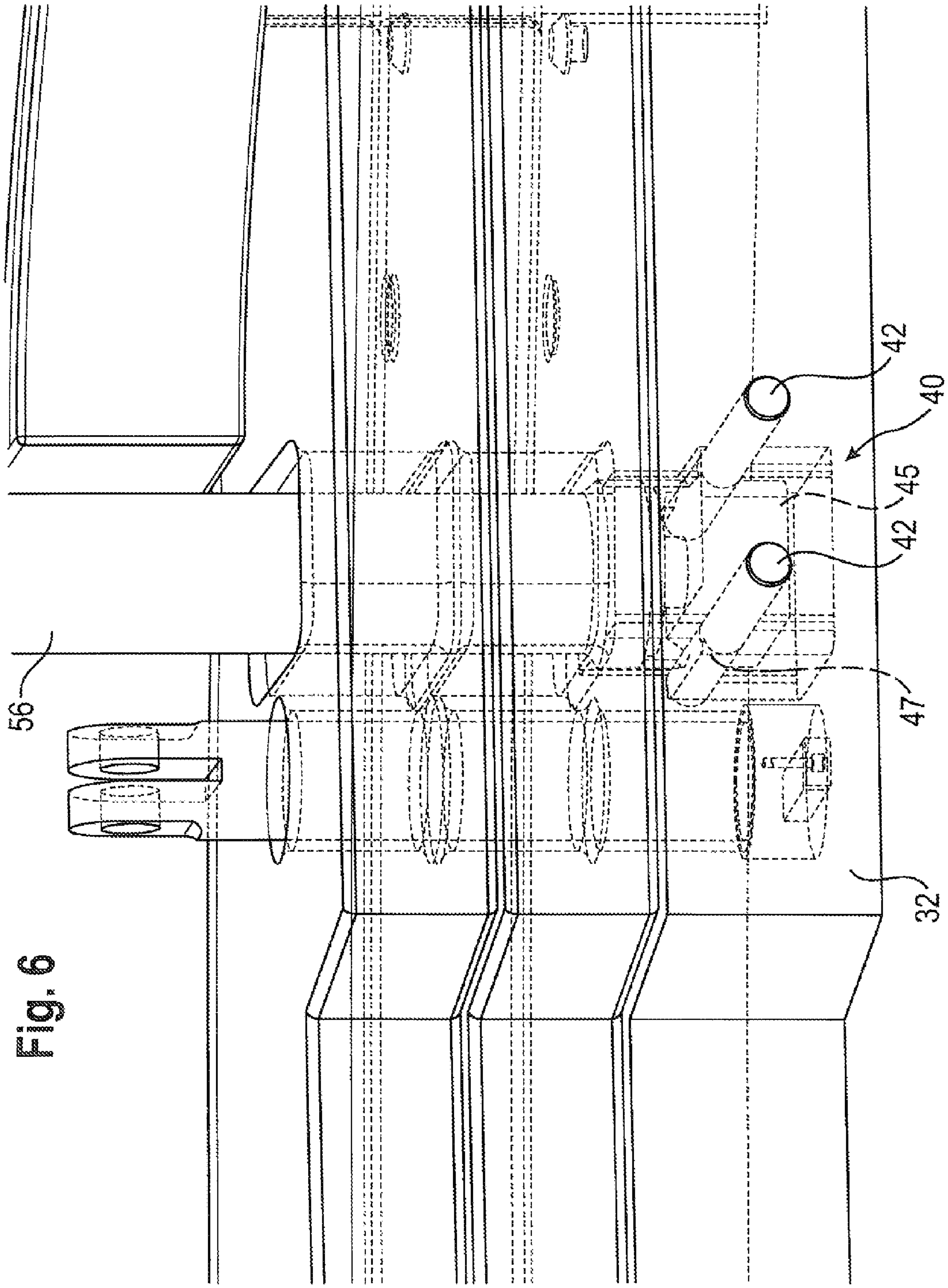
FIG. 6 shows an enlarged schematic view of a locking means.

In this extended position of the piston rods 56 the latch bolts 42 can now be inserted in an approximately horizontal fashion through corresponding boreholes in the base plate 32, as can be seen in FIG. 6 in particular. The latch bolts 42 rest on the one hand on a block-shaped conical element 45 with conical lateral surfaces on the piston rod 56 and on the other hand on a conical abutment 47 with conical lateral surfaces on the base plate 32. As a result, a form-fitting locking of the piston rod 56 with the base plate 32 and consequently with the ballast weight 30 is achieved.

Figure 7:
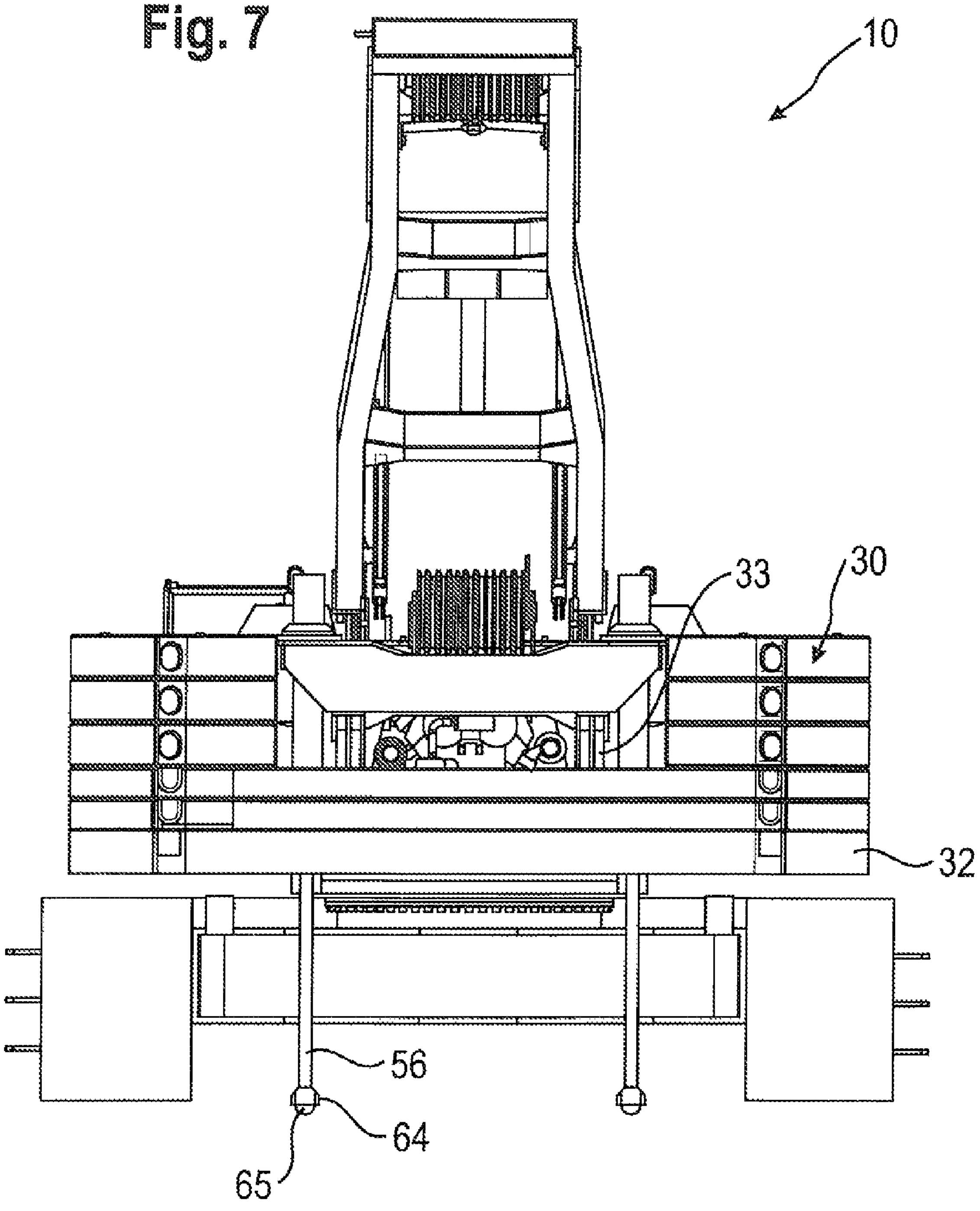
FIG. 7 shows a view of the vehicle of FIG. 4 with the ballast weight located in the mounting position.

Through retraction of the piston rods 56 the ballast weight 30 can then be moved vertically upwards into the mounting position on the upper carriage 14 of the vehicle 10. In this upwardly moved position it is now possible via a fastening means—which according to FIG. 7 is a simple bolting—to connect the ballast weight 30 in a fixed manner via the retaining shafts 33 to the upper carriage 14.

Afterwards, the locking means 40 between the piston rods 56 and the base plate 32 can be detached again. As a result, the piston rods 56 can be freely moved downwards again and, serving as support feet 64, can improve the contact surface and therefore the tilting stability of the vehicle 10. In the embodiment depicted in FIG. 7 simple spherical cups 65 are provided on the underside of the piston rod 56 to form the support foot 64. To detach and dismount the ballast weight 30 the procedure is followed vice versa.

The invention claimed is:

1. Vehicle, in particular construction vehicle, comprising:

an upper carriage including accommodating sleeves fixedly connected to the upper carriage, a detachable ballast weight, the detachable ballast weight includes a base plate and retaining shafts fixed to the base plate, fasteners to detachably fasten the detachable ballast weight on the upper carriage of the vehicle, wherein the retaining shafts protrude into the accommodating sleeves and are detachably retained therein by the fasteners, a lifting mechanism to lift the ballast weight from a set-down position into a mounting position on the vehicle, a locking bolt, an actuating cylinder to actuate the locking bolt, and a support mechanism having at least one extendable support foot, wherein the at least one extendable support foot of the support mechanism has at least one positioning cylinder configured to lift and lower the detachable ballast weight as well as to provide support for the vehicle with the extendable support foot.

2. The vehicle according to claim 1, wherein the at least one positioning cylinder has a piston rod connectable both to a support disk and to the ballast weight.

3. The vehicle according to claim 1, wherein, for each positioning cylinder, the ballast weight has a passage, through which the respective positioning cylinder reaches.

4. The vehicle according to claim 2, wherein a locking mechanism detachably connecting the ballast weight to the piston rod of the at least one positioning cylinder is provided.

5. The vehicle according to claim 4, the locking mechanism comprises at least one latch bolt for establishing a form-fitting connection.

6. The vehicle according to claim 4, wherein additional ballast plates are mountable on the base plate, and the locking mechanism is designed in the portion of the base plate.

7. The vehicle according to claim 1, wherein on the vehicle a fastening mechanism is provided, with which the ballast weight is detachably fastened on the vehicle in the mounting position.

8. The vehicle according to claim 1, wherein the vehicle has an undercarriage and the upper carriage is rotatably supported thereon, whereby in the mounting position the positioning cylinder and the ballast weight are arranged on a rear portion of the upper carriage.

9. The vehicle according to claim 8, wherein the ballast weight on the upper carriage reaches in at least one position beyond the undercarriage and is placeable vertically into the set-down position on the ground by utilizing the at least one positioning cylinder.

10. The vehicle according to claim 2, wherein during operation a support disk is arranged on the piston rod below the ballast weight in the mounting position.

11. The vehicle according to claim 1, wherein two positioning cylinders are provided, which can be actuated simultaneously for lifting and lowering the ballast weight.

12. The vehicle according to claim 1, wherein each of the retaining shafts include a bolt passage though which the locking bolt actuated by the actuating cylinder detachably fastens the detachable ballast weight on the upper carriage.

* * * * *